(12) United States Patent
Santosuosso et al.

(10) Patent No.: US 11,068,248 B2
(45) Date of Patent: Jul. 20, 2021

(54) STAGGERING A STREAM APPLICATION'S DEPLOYMENT

(71) Applicant: INTERNATIONAL BUSINESS MACHINES CORPORATION, Armonk, NY (US)

(72) Inventors: John M. Santosuosso, Rochester, MN (US); Michael J. Branson, Rochester, MN (US); Eric L. Barsness, Pine Island, MN (US); Daniel E. Beuch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/298,496

(22) Filed: Mar. 11, 2019

(65) Prior Publication Data

US 2020/0293296 A1     Sep. 17, 2020

(51) Int. Cl.
| | |
|---|---|
| *H04L 29/08* | (2006.01) |
| *H04L 29/06* | (2006.01) |
| *G06F 15/16* | (2006.01) |
| *G06F 16/2455* | (2019.01) |
| *G06F 9/48* | (2006.01) |
| *G06F 8/60* | (2018.01) |
| *G06F 9/445* | (2018.01) |

(52) U.S. Cl.
CPC ............ *G06F 8/60* (2013.01); *G06F 9/44505* (2013.01)

(58) Field of Classification Search
CPC .. H04N 13/194; H04N 13/161; H04N 13/243; H04N 21/816; H04N 21/4384; H04N 21/8456; H04N 5/23238; H04N 9/8042; H04N 9/8205; H04N 4165/60; H04N 9/80; H04N 9/8227; H04N 19/115; H04N 19/156; H04N 19/187; H04N 21/4143; H04N 5/765; G06F 9/5066; G06F 9/52; G06F 9/3879; G06F 16/24568; G06F 9/45558; G06F 21/10; G06F 8/61; G06F 16/9024; G06F 8/60; G06F 9/4881;
(Continued)

(56) References Cited

U.S. PATENT DOCUMENTS 9,218,395 B2 * 12/2015 Barsness ........... G06F 16/24568
9,262,222 B2    2/2016 Branson et al.
(Continued)

OTHER PUBLICATIONS

Shinde et al., Data parallelism for distributed streaming applications, 4 pages (Year: 2016).*

*Primary Examiner* — Thuy Dao
(74) *Attorney, Agent, or Firm* — Robert C. Bunker

(57) ABSTRACT

A method, system and computer program product for staggering a stream application's deployment, by: providing one or more configuration settings that define one or more delays for instantiation or initialization of at least one target processing element of the stream application based on the stream application's run-time conditions or events; and instantiating or initializing the target processing element of the stream application when the delays defined by the configuration settings have been satisfied. The configuration settings may define the delays to wait until a specified period of time has lapsed after one or more other processing elements have been instantiated or initialized, or to wait until a specified amount of data has been processed by one or more other processing elements, or to wait until one or more signals is received from one or more other processing elements, before instantiating or initializing the target processing element.

14 Claims, 4 Drawing Sheets

(58) Field of Classification Search
CPC .......... G06F 9/46; G06F 9/48; G06F 9/44505;
G06F 12/0653; G06F 12/0661; G06F
13/1694; G06F 13/385; G06F 13/387;
G06F 16/24542; G06F 16/24575; G06F
16/2462; H04W 84/12; H04W 4/02;
H04W 4/029; H04W 64/00; H04L
65/604; H04L 65/80; H04L 65/60; H04L
65/4084; H04L 67/02; H04L 63/10; H04L
65/602; H04L 12/185; H04L 12/189;
G11B 2220/2579; G11B 27/105; G11B
27/11; G06Q 30/0633
See application file for complete search history.

(56) References Cited

U.S. PATENT DOCUMENTS

| | | | | |
|---|---|---|---|---|
| 9,614,740 | B2* | 4/2017 | Branson | H04L 43/0811 |
| 9,990,236 | B2* | 6/2018 | Zhang | G06F 9/5083 |
| 2007/0195654 | A1* | 8/2007 | Chen | G11B 20/10527 |
| | | | | 369/30.23 |
| 2009/0288166 | A1* | 11/2009 | Brown | G06F 21/51 |
| | | | | 726/23 |
| 2011/0161536 | A1* | 6/2011 | Aue | H04B 1/40 |
| | | | | 710/105 |
| 2013/0182798 | A1* | 7/2013 | Lozano | H04W 4/18 |
| | | | | 375/340 |
| 2014/0098748 | A1* | 4/2014 | Chan | H04W 72/082 |
| | | | | 370/329 |
| 2014/0237134 | A1 | 8/2014 | Branson et al. | |
| 2014/0244857 | A1* | 8/2014 | Hahm | H04L 43/0888 |
| | | | | 709/231 |
| 2015/0081708 | A1 | 3/2015 | Branson et al. | |
| 2015/0128135 | A1* | 5/2015 | Cao | G06F 9/5066 |
| | | | | 718/1 |
| 2015/0161289 | A1 | 6/2015 | Branson et al. | |
| 2017/0054776 | A1* | 2/2017 | Dao | H04L 65/1089 |
| 2018/0316677 | A1* | 11/2018 | Hitomi | G06F 9/468 |
| 2019/0289054 | A1* | 9/2019 | Choi | H04L 65/607 |

* cited by examiner

STAGGERING A STREAM APPLICATION'S DEPLOYMENT

BACKGROUND

The present invention relates generally to staggering a stream application's deployment.

A stream application comprises one or more streams of data flowing through one or more processing elements of an operator graph. The processing elements of the operator graph are typically instantiated when the operator graph is executed. After a processing element is instantiated, an initialization is performed that prepares the processing element for receiving, processing and transmitting data. After the initialization is complete, a processing element invokes call-back logic, known as "all ports are ready," that signals a preceding processing element or data source that the processing element can receive data.

It has been noticed that sometimes there needs to be a delay to allow for more than just "all ports are ready" signaling to the preceding processing element or data source. To accomplish this result, an "initDelay" configuration setting has been added to stream programming environments to initialize a delay, namely "wait X units of time," before the processing element begins to perform work.

As stream programming evolves and more applications are written, the delay provided by the initDelay configuration setting has proven inadequate. What is needed is additional functionality for instantiating and/or initializing the processing elements. The present invention satisfies this need.

SUMMARY

The invention provided herein has many embodiments useful, for example, in implementing a method, system and computer program product for staggering a stream application's deployment, by: providing one or more configuration settings that define one or more delays for instantiation or initialization of at least one target processing element of the stream application based on the stream application's run-time conditions or events; and instantiating or initializing the target processing element of the stream application when the delays defined by the configuration settings have been satisfied.

The configuration settings may define the delays to wait until a specified period of time has lapsed after one or more other processing elements have been instantiated or initialized before instantiating or initializing the target processing element; the configuration settings may define the delays to wait until a specified amount of data has been processed by one or more other processing elements before instantiating or initializing the target processing element; and/or the configuration settings may define the delays to wait until one or more signals is received from one or more other processing elements before instantiating or initializing the target processing element.

The stream application is represented by an operator graph and the target processing element is instantiated or initialized by a stream manager interpreting and controlling the operator graph. Data intended for input to the target processing element may be buffered or discarded before the target processing element is instantiated or initialized.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention provides a technique for staggering a stream application's deployment. Specifically, this invention provides a methodology to allow the stream application's run-time conditions and events to delay the instantiation and/or initialization of one or more processing elements.

Cloud Computing Environment

Figure 1:
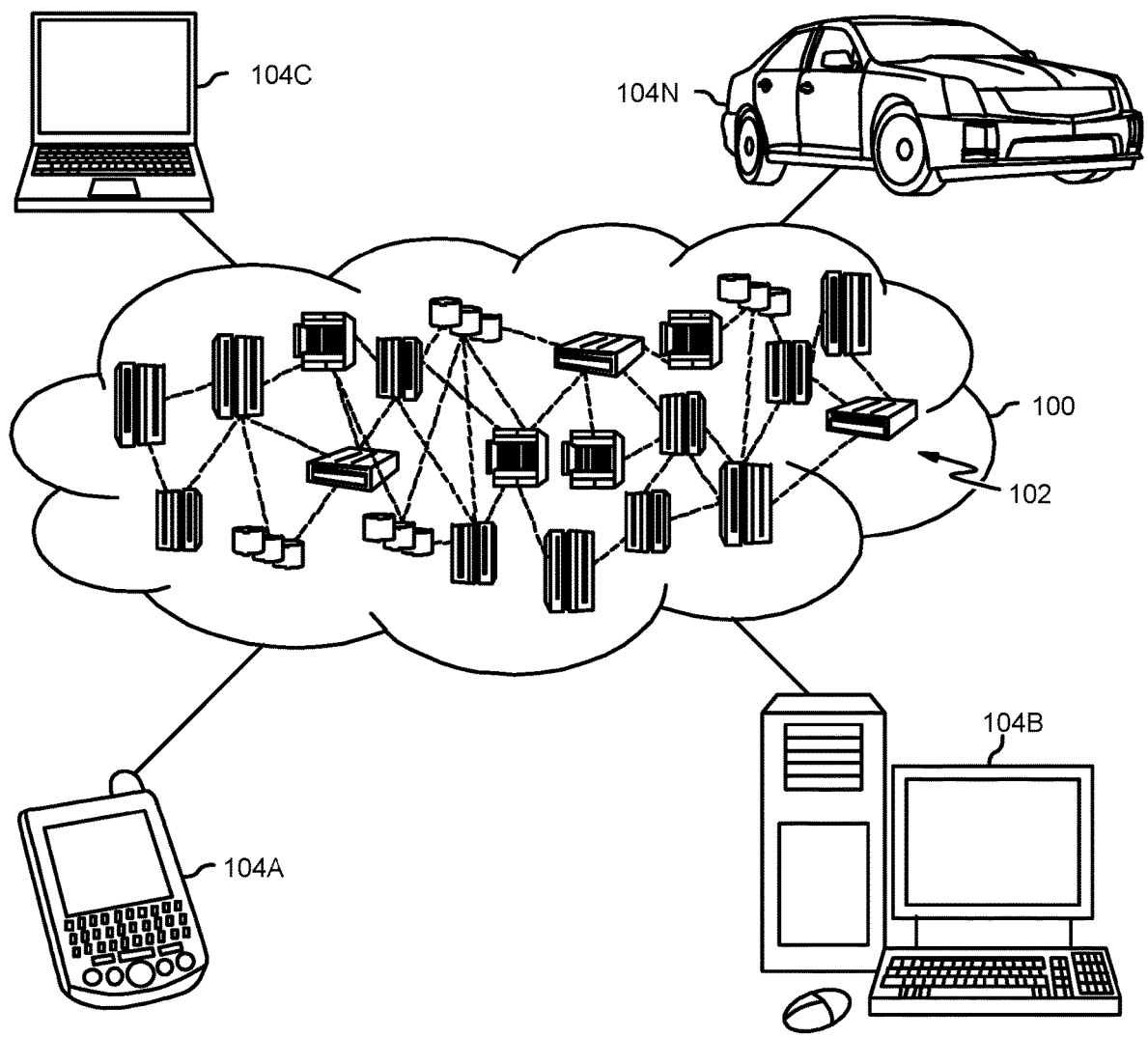
FIG. 1 is a pictorial representation of an illustrative cloud computing environment used for staggering a stream application's deployment, according to one embodiment.

FIG. 1 is a pictorial representation of an illustrative cloud computing environment 100 used for staggering a stream application's deployment, according to one embodiment.

As shown, a cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Staggering a Stream Application's Deployment

Figure 2:
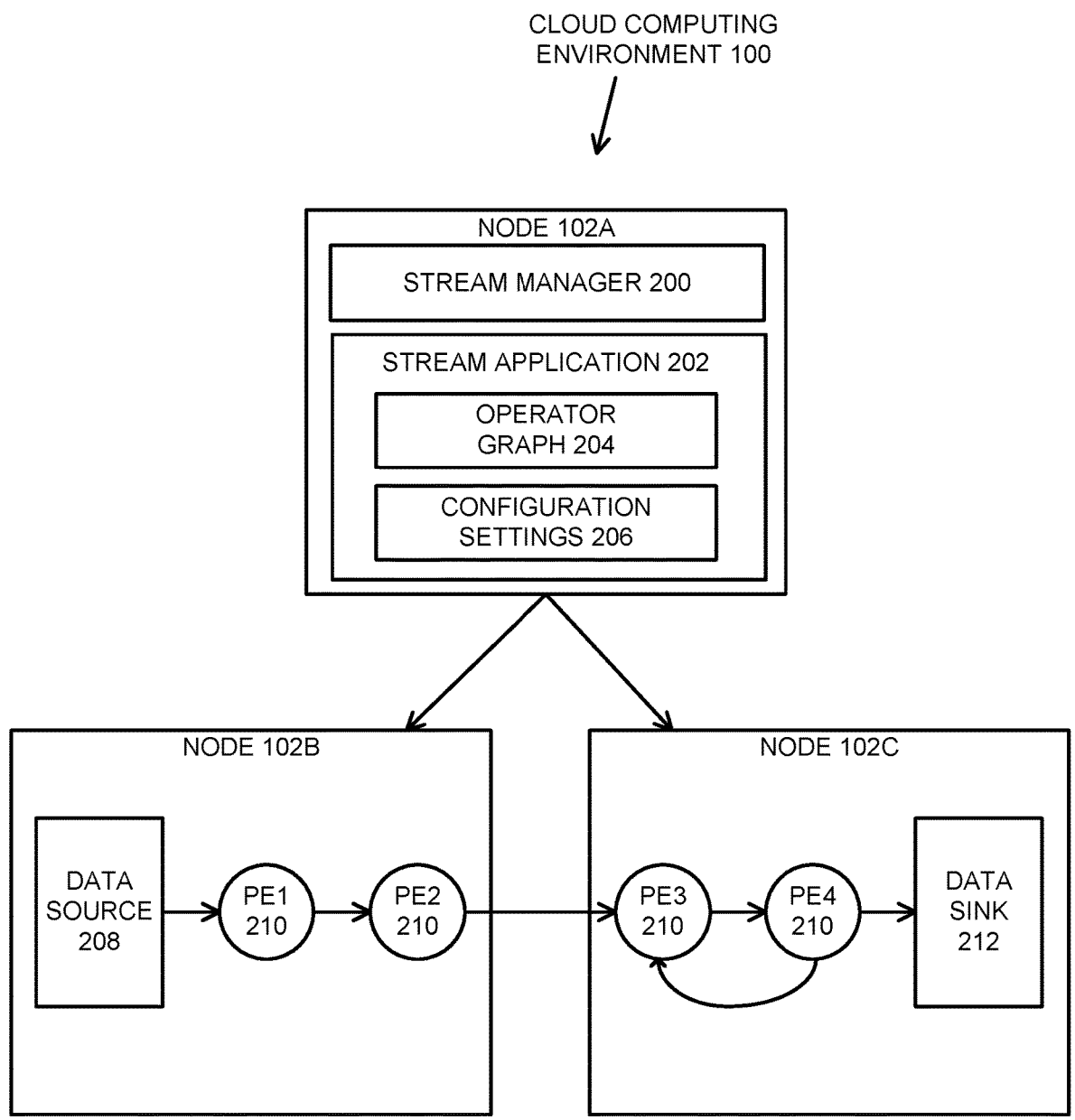
FIG. 2 illustrates how the cloud computing environment is configured to stagger a stream application's deployment, according to one embodiment.

FIG. 2 illustrates how a stream application's deployment is staggered across the nodes 102 of the cloud computing environment 100, according to one embodiment.

In this example, one of the nodes 102A executes a stream manager 200, which in turn controls execution of a stream application 202, wherein the stream application 202 is represented by an operator graph 204 and includes one or more configuration settings 206. The operator graph 204 defines a data source 208 that transmits data as input to one or more processing elements (PEs) 210, also labeled as PE1, PE2, PE3 and PE4, wherein each of the PEs 210 comprises one or more operators that processes the data, and output from the PEs 210 is then transmitted as data to another PE 210 or a data sink 212.

The stream of data from the data source 208 through the PEs 210 to the data sink 212 is also generally referred to as an execution path for the stream application 202. Typically, the PEs 210 receive data comprised of one or more tuples from the stream, as well as emit data comprised of one or more tuples into the stream. The PEs 210 perform data processing functions on the tuples of the received data, such as reads, writes, updates, deletes, etc., as well as other data processing functions.

The flow of the stream application 202 begins at the data source 208 and data flows sequentially through PE1 210, PE2 210, PE3 210, and PE4 210, until the data flows into sink 212, although the data may also flow between PE4 210 and PE3 210 as shown by the return arrow between PE4 210 and PE3 210. PEs 210 may communicate through inter-process communications, as well as shared memory or storage.

Previously, the stream manager 200 would fully deploy the stream application 202 on the nodes 102B and 102C, and then monitors the run-time conditions and events of the stream application 202. In this invention, instantiation and/or initialization of PEs 210 may be dynamic and controlled by the stream manager 200. Specifically, the stream manager 200 staggers the deployment of the stream application 202 on the nodes 102B and 102C, based on the configuration settings 206 and monitoring of one or more run-time conditions and events of the stream application 202.

For example, the stream manager 200 may stagger the deployment of data source 208, PE1 210 and PE2 210 on a first node 102B, as well as the deployment of PE3 210, PE4 210 and data sink 212 on a second node 102C. The stream manager 200 may also move the data source 208, one or more of the PEs 210, and the data sink 212, from one node 102B to another node 102C, or vice versa, to manage the processing loads of the nodes 102B, 102C.

In this example, the stream manager 200 may instantiate and/or initialize one or more of the PEs 210 only when run-time conditions or events of the stream application 202 satisfy one or more conditions of the configuration settings 206. In one embodiment, the configuration settings 206 are defined to wait X units of time after one or more other PEs 210 have been instantiated and/or initialized before instantiating and/or initializing a target PE 210. In another embodiment, the configuration settings 206 are defined to wait until X tuples have been processed by one or more other PEs 210 before instantiating and/or initializing a target PE 210. In yet another embodiment, the configuration settings 206 are defined to wait until a signal is received from one or more other PEs 210 before instantiating and/or initializing a target PE 210. Only after these conditions or events have been satisfied, does the stream manager 200 instantiate and/or initialize the target PE 210 so that the target PE 210 can begin processing data.

In one embodiment, data destined for a target PE 210 is buffered when it is available before the target PE 210 is instantiated and/or initialized. In another embodiment, data destined for a target PE 210 is simply discarded when it is available before the target PE 210 is instantiated and/or initialized.

Flowchart

Figure 3:
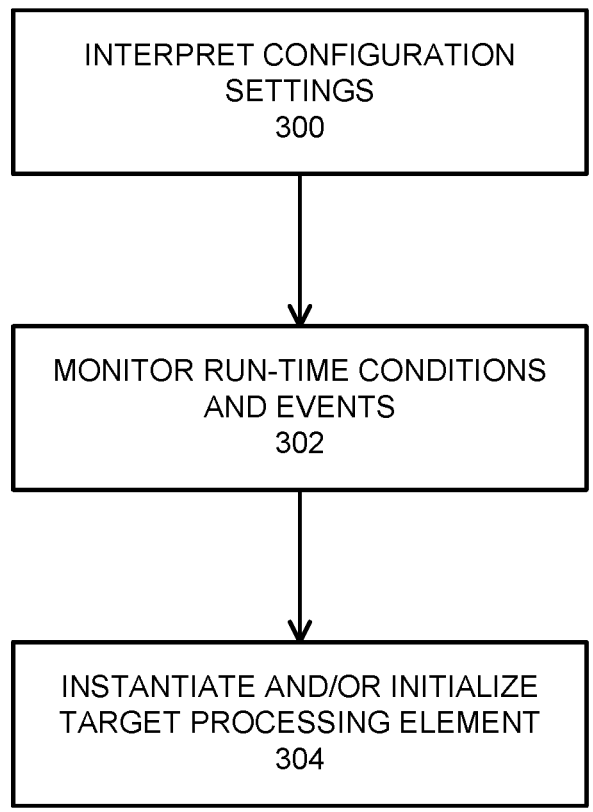
FIG. 3 is a flowchart illustrating the logic performed by the stream manager when executing the operator graph, according to one embodiment.

FIG. 3 is a flowchart illustrating the logic performed by the stream manager 200 when executing the stream application 202, according to one embodiment.

Block 300 represents the stream manager 200 interpreting one or more configuration settings 206 provided by the stream application 202, wherein the configuration settings 206 define one or more delays of the instantiation or initialization of at least one target PE 210 of the stream application based on run-time conditions or events of the stream application 202.

Block 302 represents the stream manager 200 monitoring the run-time conditions and events of the stream application 202 to determine whether the delays defined by the configuration settings 206 have been satisfied. This Block also represents the stream manager 200, the data source 206, and/or other PEs 210, buffering or discarding data intended for input to the target PE 210 before the target PE 210 is instantiated or initialized, wherein the data may be buffered or discarded according to the configuration settings 206.

Block 304 represents the stream manager 200 instantiating or initializing the target PE 210 of the stream application 202 when the delays defined by the configuration settings 206 have been satisfied. In one embodiment, the configuration settings 206 define a delay to wait until a specified period of time has lapsed after one or more other PEs 210 have been instantiated or initialized before instantiating or initializing the target PE 210; in another embodiment, the configuration settings 206 define a delay to wait until a specified amount of data has been processed by one or more other PEs 210 before instantiating or initializing the target PE 210; in yet another embodiment, the configuration settings 206 define a delay to wait until one or more signals are received from the stream manager 200, the data source 208, and/or one or more other PEs 210, before instantiating or initializing the target PE 210.

Statutory Subject Matter

It can be seen that the present invention provides a number of benefits and advantages. These benefits and advantages include improvements to the technology or technical field related to stream applications, and more specifically, providing for a staggered deployment of a stream application. These benefits and advantages also include improvements to the functioning of the devices themselves, including the cloud computing environment 100 generally and the computing nodes 102 specifically, as compared to prior computer-implemented stream applications.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 4:
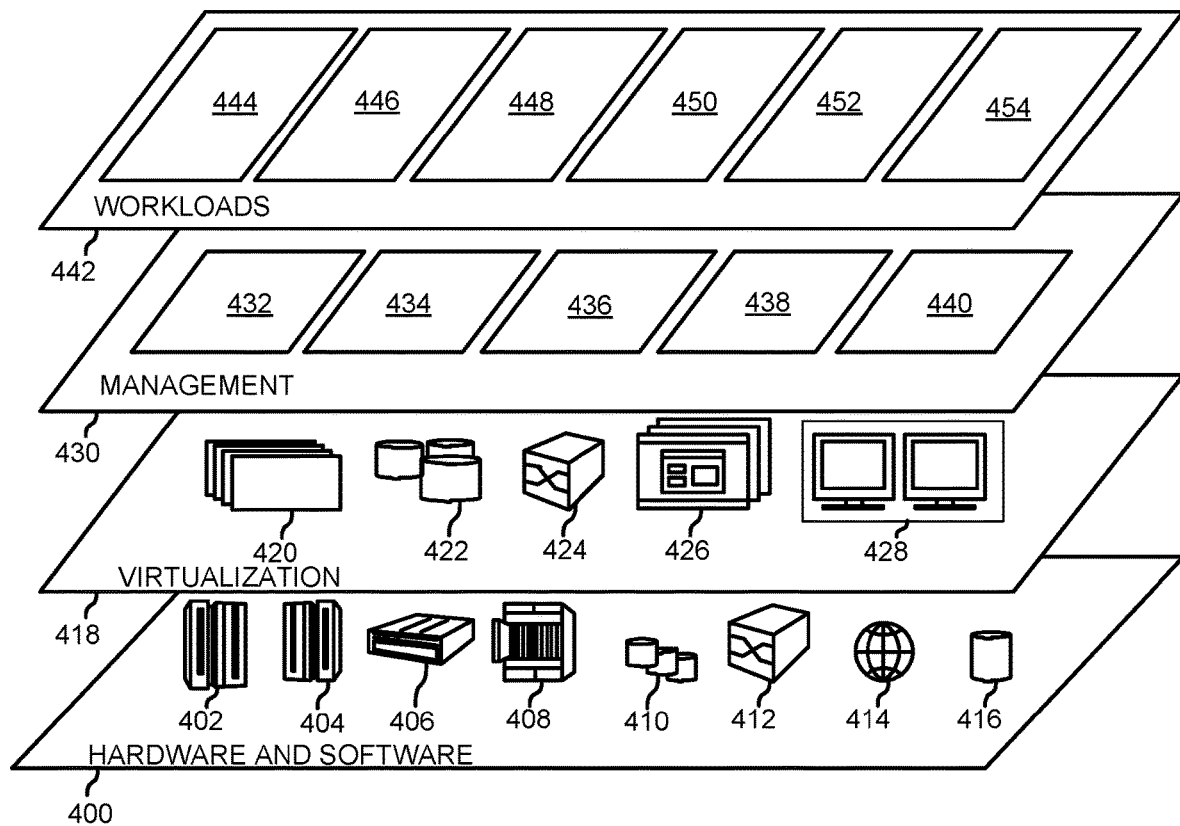
FIG. 4 illustrates a set of functional abstraction layers provided by the cloud computing environment.

Referring now to FIG. 4, a set of functional abstraction layers provided by cloud computing environment 100 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402, RISC (Reduced Instruction Set Computer) architecture based servers 404, servers 406, and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 100. Metering and pricing 434 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 436 provides access to the cloud computing environment 100 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 100 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions for staggering a stream application's deployment as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Conclusion

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
   staggering a stream application's deployment on one or more computers, by:
      providing one or more configuration settings that define a plurality of delays for instantiation or initialization of at least one target processing element of the stream application based on the stream application's run-time conditions or events, wherein the one or more configuration settings define a first delay to wait until a first signal is received from one or more other processing elements and a second signal is received from a stream manager, wherein the one or more configuration settings define a second delay to wait until a specified amount of data has been processed by the one or more other processing elements exceeds a threshold value, wherein the stream application is represented by an operator graph, and wherein the one or more processing elements of the operator graph are instantiated when the operator graph is executed, and after the initialization is complete, a processing element invokes call-back logic, that signals a preceding processing element or data source that the processing element can receive data; and
      instantiating or initializing the target processing element of the stream application when the plurality of delays defined by the configuration settings have been satisfied.

2. The method of claim 1, wherein the configuration settings further define the plurality of delays to include waiting until a specified period of time has lapsed after one or more other processing elements have been instantiated or initialized before instantiating or initializing the target processing element.

3. The method of claim 1, wherein the target processing element is instantiated or initialized by a stream manager interpreting and controlling the operator graph.

4. The method of claim 1, wherein data intended for input to the target processing element is buffered before the target processing element is instantiated or initialized.

5. The method of claim 1, wherein data intended for input to the target processing element is discarded before the target processing element is instantiated or initialized.

6. A computer-implemented system, comprising:
   one or more computers programmed for staggering a stream application's deployment, by:
      providing one or more configuration settings that define a plurality of delays for instantiation or initialization of at least one target processing element of the stream application based on the stream application's run-time conditions or events, wherein the one or more configuration settings define a first delay to wait until a first signal is received from one or more other processing elements and a second signal is received from a stream manager, wherein the one or more configuration settings define a second delay to wait until a specified amount of data has been processed by the one or more other processing elements exceeds a threshold value, wherein the stream application is represented by an operator graph, and wherein the one or more processing elements of the operator graph are instantiated when the operator graph is executed, and after the initialization is complete, a processing element invokes call-back logic, that signals a preceding processing element or data source that the processing element can receive data; and
      instantiating or initializing the target processing element of the stream application when the plurality of delays defined by the configuration settings have been satisfied.

7. The system of claim 6, wherein the configuration settings further define the plurality of delays to include waiting until a specified period of time has lapsed after one or more other processing elements have been instantiated or initialized before instantiating or initializing the target processing element.

8. The system of claim 6, wherein the target processing element is instantiated or initialized by a stream manager interpreting and controlling the operator graph.

9. The system of claim 6, wherein data intended for input to the target processing element is buffered before the target processing element is instantiated or initialized.

10. The system of claim 6, wherein data intended for input to the target processing element is discarded before the target processing element is instantiated or initialized.

11. A computer program product, the computer program product comprising a computer readable storage medium having program instructions embodied therewith, the program instructions executable by one or more computers to cause the computers to perform a method, comprising:
    staggering a stream application's deployment on the one or more computers, by:
       providing one or more configuration settings that define a plurality of delays for instantiation or initialization of at least one target processing element of the stream application based on the stream application's run-time conditions or events, wherein the one or more configuration settings define a first delay to wait until a first signal is received from one or more other processing elements and a second signal is received from a stream manager, wherein the one or more configuration settings define a second delay to wait until a specified amount of data has been processed by the one or more other processing elements exceeds a threshold value, wherein the stream application is represented by an operator graph, and wherein the one or more processing elements of the operator graph are instantiated when the operator graph is executed, and after the initialization is complete, a processing element invokes call-back logic, that signals a preceding processing element or data source that the processing element can receive data; and instantiating or initializing the target processing element of the stream application when the plurality of delays defined by the configuration settings have been satisfied.

12. The computer program product of claim 11, wherein the configuration settings further define the plurality of delays to include waiting until a specified period of time has lapsed after one or more other processing elements have been instantiated or initialized before instantiating or initializing the target processing element.

13. The computer program product of claim 11, wherein the target processing element is instantiated or initialized by a stream manager interpreting and controlling the operator graph.

14. The computer program product of claim 11, wherein data intended for input to the target processing element is buffered or discarded before the target processing element is instantiated or initialized.

* * * * *